United States Patent
Hauser

(10) Patent No.: US 10,888,190 B2
(45) Date of Patent: Jan. 12, 2021

(54) FLEXIBLE TUBULAR GARLIC PEELER HAVING A RIGID PICK

(71) Applicant: Progressive International Corporation, Kent, WA (US)

(72) Inventor: Lawrence Michael Hauser, Auburn, WA (US)

(73) Assignee: Progressive International Corporation, Kent, WA (US)

(*) Notice: Subject to any disclaimer, the term of this patent is extended or adjusted under 35 U.S.C. 154(b) by 483 days.

(21) Appl. No.: 15/646,378

(22) Filed: Jul. 11, 2017

(65) Prior Publication Data

US 2018/0020863 A1    Jan. 25, 2018

Related U.S. Application Data

(60) Provisional application No. 62/361,951, filed on Jul. 13, 2016.

(51) Int. Cl.
*A47J 17/02*    (2006.01)

(52) U.S. Cl.
CPC .................... *A47J 17/02* (2013.01)

(58) Field of Classification Search
CPC ... A47J 17/02; A47J 17/10; F16B 7/00; F16B 7/20
USPC .......................................................... 99/584
See application file for complete search history.

(56) References Cited

U.S. PATENT DOCUMENTS

| | | | | |
|---|---|---|---|---|
| 3,571,925 A | * | 3/1971 | Deutschmann | A47J 17/04 30/314 |
| 3,734,003 A | * | 5/1973 | Gerson | A47J 17/02 99/588 |
| 4,128,356 A | * | 12/1978 | Carlisle | F16B 7/0413 402/26 |
| 5,573,803 A | * | 11/1996 | Omessi | A47J 17/02 426/483 |
| 5,575,315 A | * | 11/1996 | Wengert | B65B 67/04 141/10 |
| 5,879,304 A | * | 3/1999 | Shuchman | A61B 1/00103 600/193 |
| 2009/0293289 A1 | * | 12/2009 | Gallop | B26B 3/02 30/298.4 |
| 2016/0227954 A1 | * | 8/2016 | Chang | A47J 17/02 |

FOREIGN PATENT DOCUMENTS

WO    WO-2005032314 A1 *  4/2005  .............. A47J 17/02

* cited by examiner

*Primary Examiner* — Serkan Akar
*Assistant Examiner* — Spencer H. Kirkwood
(74) *Attorney, Agent, or Firm* — Lowe Graham Jones PLLC

(57) ABSTRACT

A peeler is formed with a tubular main body having a first open end, an opposing second open end, and a hollow interior extending from the first open end to the second open end. The tubular main body is formed from a first flexible material allowing the tubular main body to deform under pressure by a use. A pick is attached to the first open end and extends away from the second open end, the pick being formed from a second material, the second material being different from the first material and further being relatively more rigid than the first material.

9 Claims, 5 Drawing Sheets

FLEXIBLE TUBULAR GARLIC PEELER HAVING A RIGID PICK

PRIORITY CLAIM

This application claims the benefit of US provisional application No. 62/361,951 filed Jul. 13, 2016, the contents of which are incorporated by reference.

FIELD OF THE INVENTION

The present invention relates to devices for removing the outer skin of a vegetable or similar food item, such as a clove of garlic.

BACKGROUND OF THE INVENTION

The skin from a clove of garlic or other similar food item can be removed by using any of a variety of methods, such as a person's hands, a knife, or other tools. One such tool is a tubular flexible peeler. One example of a tubular garlic peeler is shown in U.S. Pat. No. 5,573,803, describing the use of a flexible tube in which garlic is placed inside the tube, and then adding pressure and rolling the tube to cause the skin to separate from the clove as a result of friction applied by the inside of the tube. Garlic peelers of this sort work reasonably well, but they tend not to be perfect. In particular, there are often areas on a clove of garlic in which bits of skin will remain attached, requiring a knife or other tool to remove it. Though the skin may be loosened or wrinkled with such devices, it can still nonetheless be challenging to remove it.

SUMMARY OF THE INVENTION

In a preferred version of the invention, a peeler is formed with a tubular main body having a first open end, an opposing second open end, and a hollow interior extending from the first open end to the second open end. The tubular main body is formed from a first flexible material allowing the tubular main body to deform under pressure by a use. A pick is attached to the first open end and extends away from the second open end, the pick being formed from a second material, the second material being different from the first material and further being relatively more rigid than the first material.

In one example, the peeler has a top extending from the first open end to the second open end, and a bottom diametrically opposite the top and extending from the first open end to the second open end, the top having a length which is shorter than a length of the bottom.

In one version, the pick further defines a tooth end and a mount end, the mount end being attached to the tubular main body and the tooth end extending away from the tubular main body.

The first open end may further have a first top rim and the second open end may have a second top rim, the pick having a pick axial length from the tooth end to the mount end, wherein less than one third of the pick axial length extends into the interior of the tubular main body between the first top rim and the second top rim.

In one version, less than one quarter of the pick axial length extends into the interior of the tubular main body between the first top rim and the second top rim.

Preferably, the tubular main body defines a circumference and the pick is attached to the tubular main body along a portion of the circumference, the portion of the circumference being less than 180 degrees.

In one example, the portion of the circumference is less than 140 degrees.

In another example, the portion of the circumference is less than 120 degrees.

In another example, the portion of the circumference is less than 100 degrees.

Preferably, the pick is rounded along a portion of the circumference.

In a preferred version, the tooth end terminates in a point.

Most preferably, the tubular main body is formed from an elastomeric material and the pick is formed from a rigid plastic material.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
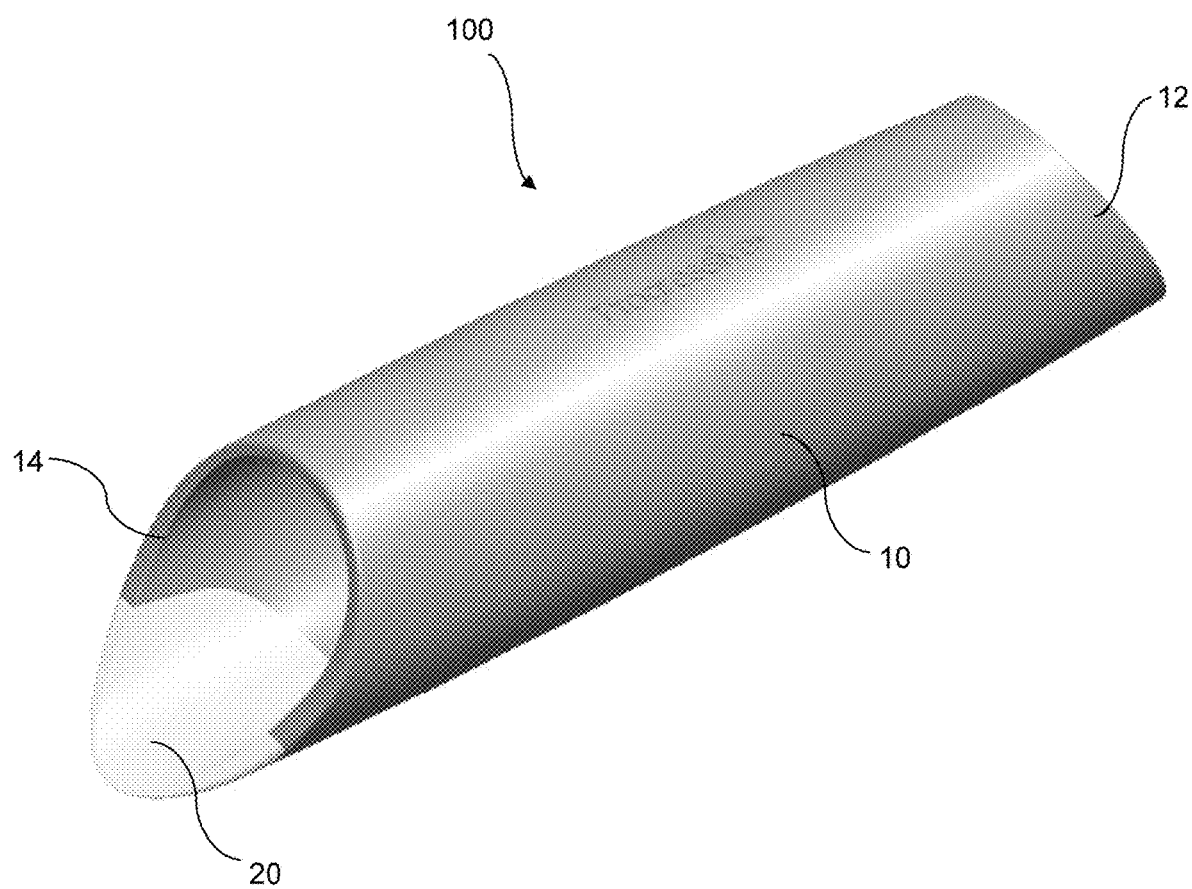
FIG. 1 is a front top perspective view of a preferred garlic peeler.
Figure 2:
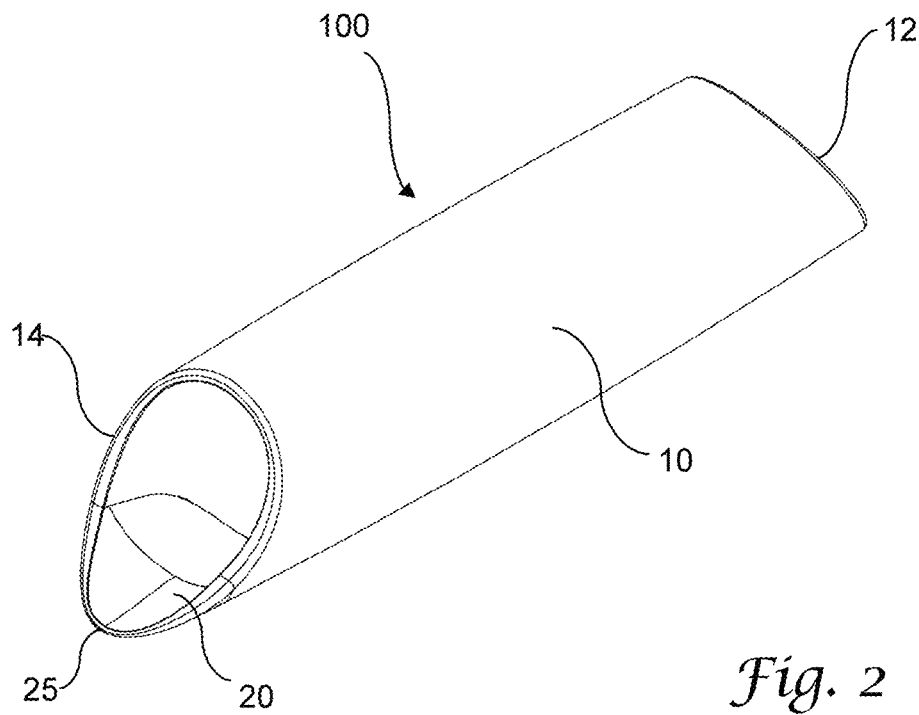
FIG. 2 is a front top perspective view of a preferred garlic peeler.
Figure 3:
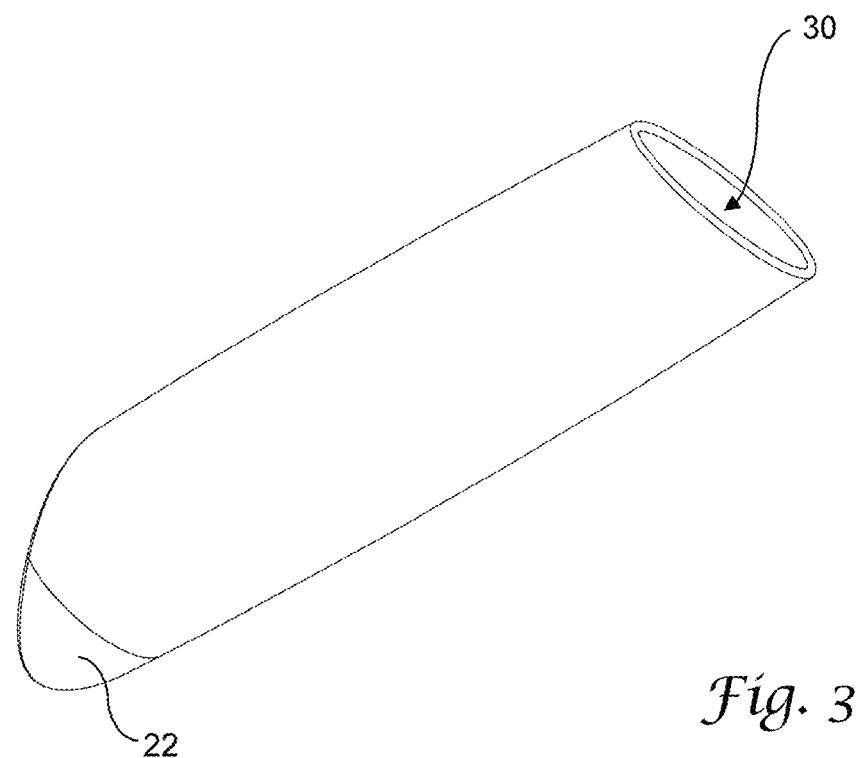
FIG. 3 is a front bottom perspective view of a preferred garlic peeler.

An example of a preferred garlic peeler 100 is illustrated in top perspective views in FIGS. 1 and 2, and includes a main tubular body 10 having a first end 14 and a second end 12. Most preferably, the main body 10 is formed integrally from an elastomeric material such as food grade silicone. The main body may be formed from other flexible materials, preferably thermoplastic elastomers, such as rubber or santoprene. The outer walls of the main body form an internal cavity 30 (best seen in FIG. 5) allowing garlic or other food items to enter either the first end or the second end, and exit either the first end or the second end. In the illustrated example, the interior sidewalls are generally smooth, but in other versions the interior sidewalls may have a series of ribs which (for example) extend axially and continuing about the entire interior circumference.

Figure 8:
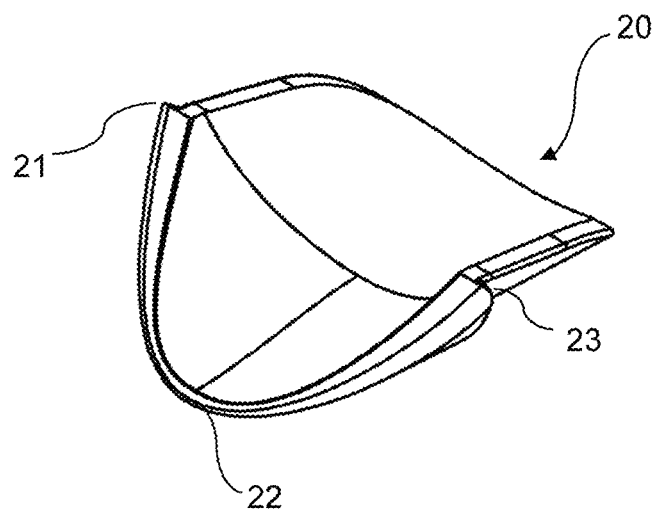
FIG. 8 is a top perspective view of a preferred pick for a garlic peeler.
Figure 9:
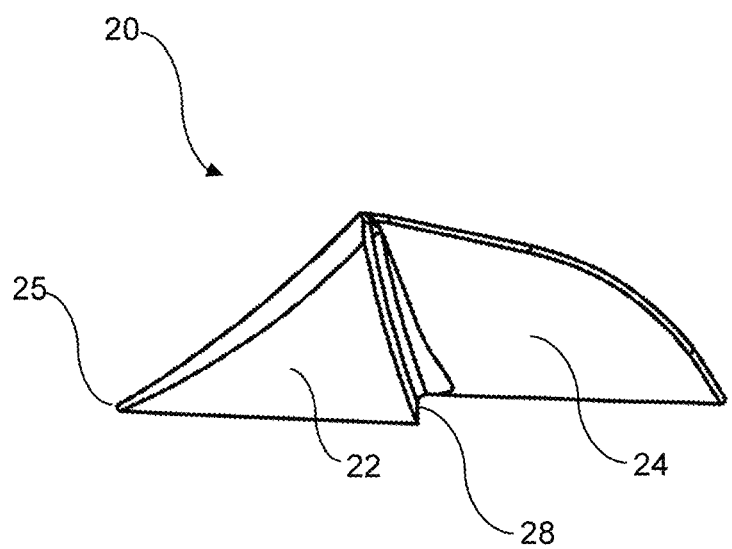
FIG. 9 is a front view of a preferred garlic peeler of the pick of FIG. 8.

One end of the main body includes a pick 20, shown detached from the main tubular body 10 in FIGS. 8 and 9. Whereas the body is formed from a first resilient material such as silicone, the pick is formed from a second material which is more rigid than the first material. In one version, the pick is formed from nylon. In other versions, the pick may be formed form other rigid or semi-rigid plastics, metal, or other such materials. Most preferably, the pick is formed with a rounded lower surface 22 which follows the same curvature of the main body 10, which is generally cylindrical in the preferred version. An opposing upper surface of the pick follows a similar shape.

Figure 4:
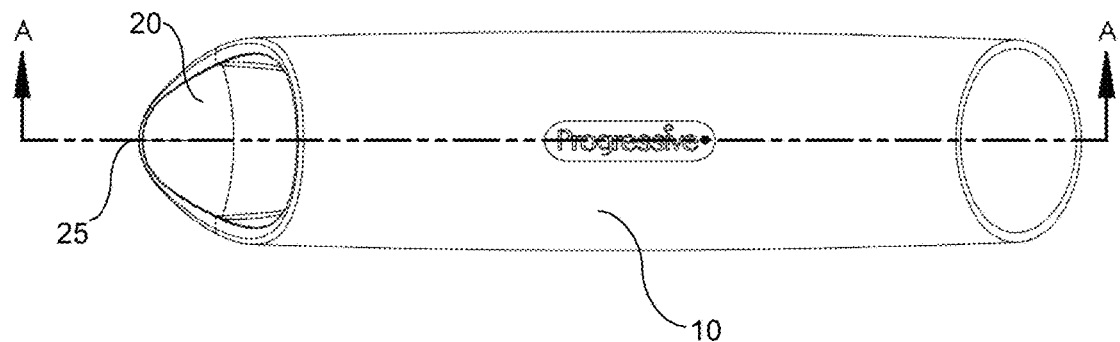
FIG. 4 is a top view of a preferred garlic peeler.
Figure 5:
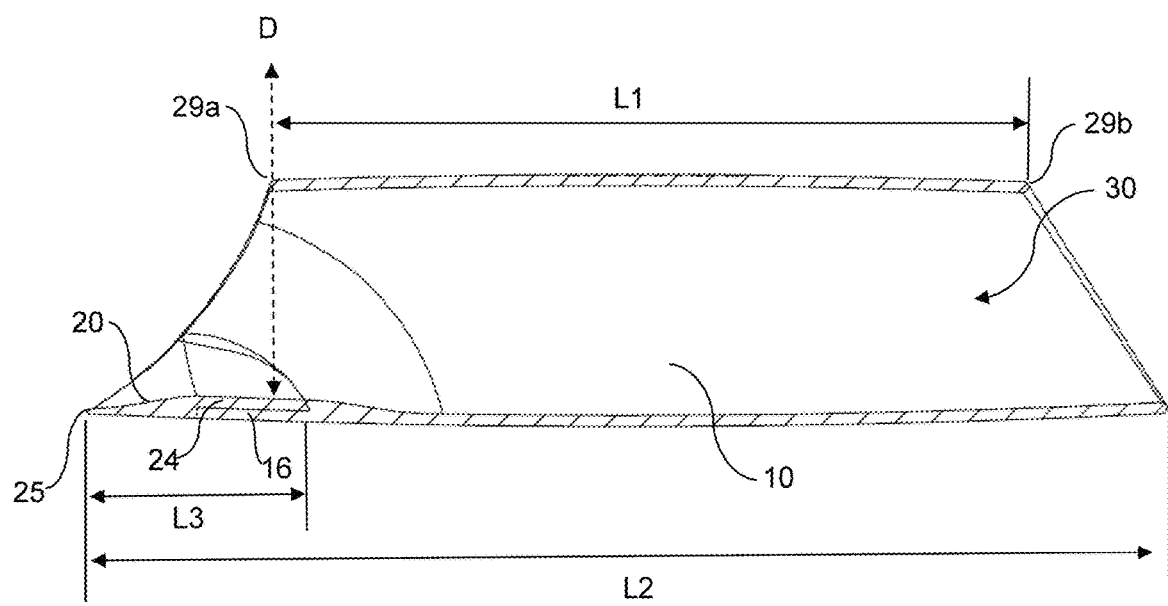
FIG. 5 is a sectional view of a preferred garlic peeler, taken along plane A-A in FIG. 4.
Figure 6:
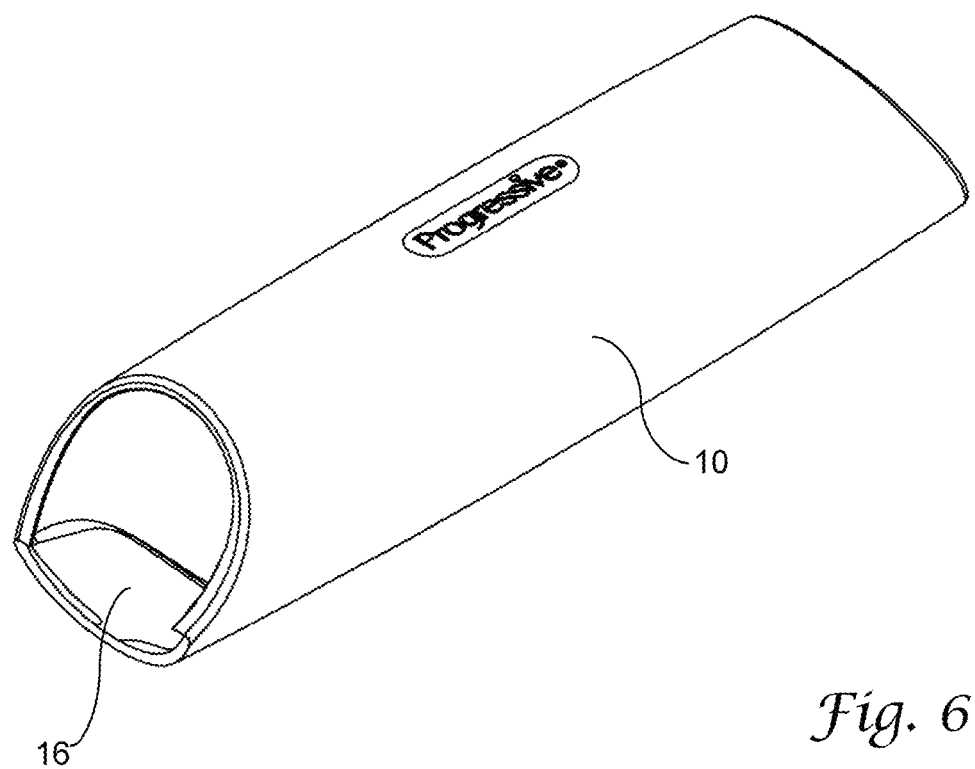
FIG. 6 is a front top perspective view of a preferred garlic peeler, shown without a preferred pick.

In one example, as best seen in the top and sectional views of FIGS. 4 and 5, the main body 10 is formed with an outer wall which is shorter at the top (having a length L1 which extends from a rim at the first end to a rim at the second end), than it is at the bottom (having a length L2 which extends from the tip of the pick at the first end to the rim at the second end). As a tubular member, the top and bottom can be at any chosen location about the circumference of the tube, but are located at positions that are diametrically opposite one another. In the illustrated version, the shorter length L1 is positioned with respect to the longer length L2 so that the main body is generally symmetrical when viewed from the side. In other versions, the main body may have an inclined opening on one end (such as only the first end 14, see FIG. 2) while having a second end 12 that terminates in a circle rather than in an oval as is the case with the inclined end.

In one version, the pick is attached to the main body by over-molding the main body onto the pick, as best seen in the sectional view of FIG. 5. Thus, the pick 20 is formed with a tooth end 25 and a mount end 24, with the mount end being raised slightly from the tooth end and having a shoulder or abutment 28 (see FIG. 9). The main body includes a somewhat thinner over-molded region 16 that overlaps the mount end and adheres the pick to the main body. In other versions, the pick may be glued or otherwise adhered or attached to the main body.

The tooth end of the pick extends away from the main body, terminating in a pointed end which is useful for inserting between the skin and the meat of a clove of garlic to facilitate the removal of skin that is otherwise still stuck to the clove. In one example, the tooth end terminates in a narrowed but still rounded end as it progresses away from the main body. In another example, the tooth end may be more sharply pointed rather than slightly rounded. Most preferably, the tooth end is also formed to be somewhat thinner than the portion of the pick that is more closely adjacent to the main body.

As illustrated and best seen in FIGS. 4 and 5, the narrowed or pointed portion of the tooth end is aligned with the longest portion of the main body, having sidewall length L2 and forming a part of the longest length L2. Most preferably, the pick and tooth end are diametrically opposite the first top rim 29a of the shorter sidewall length L1 (which extends from the first top rim 29a to the second top rim 29b), thereby providing an open area immediately above the pick to allow it to more readily get at the clove of garlic.

Figure 7:
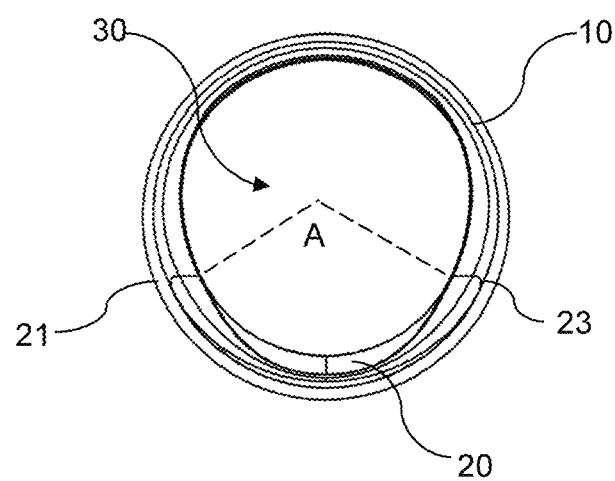
FIG. 7 is an end view of a preferred garlic peeler.

Most preferably, the pick does not extend around the majority of the circumference defined by the main body, nor does it extend appreciably into the interior of the main body. Thus, as best seen in the end view of the preferred version in FIG. 7, looking into the open hollow interior 30, the pick 20 preferably terminates in a first peripheral edge 21 and a second peripheral edge 23 so that it extends along a portion of the circumference that is less than or equal to about 120 degrees, indicated by angle A. In other versions, the angle A is between about 100 degrees and 140 degrees. In most preferred versions, the angle A is less than 180 degrees. By limiting the circumferential size of the pick, the pick will not interfere with the ability to roll the main body in order to remove the skin from the clove.

The pick preferably extends at most only slightly into the interior of the main body. As shown and best seen in FIG. 5, the axial length of the pick extends along a distance L3. A plane D extends perpendicularly to the long axis defined by the tubular main body 10, and therefore perpendicularly to the axes defining the lengths L1 and L2. The plane D extends through a tangent defined at the tip of the first top rim 29a. Thus, in the preferred version the majority of the length L3 extends beyond the upper short sidewall rim 29 and the first top rim 29a, and peripherally away from the tubular main body. In the preferred version less than one third, and more preferably less than one quarter, of the total length L3 of the pick extends into the interior space 30 to a point internally beyond the upper short sidewall rim 29 (so that it is positioned within the portion of the tubular main body between the first top rim 29a and the second top rim 29b). As noted above, this short length of the pick, and particularly the short distance by which it extends into the interior 30 of the tubular main body 10, ensures that the pick does not interfere with the ability of a user to roll the main body with a clove of garlic inside.

In use, a person may insert a clove of garlic into the interior space within the main tubular body. Force is then applied by a user by pressing down against the outer surface of the tubular main body and rolling it back and forth, thereby imparting a frictional force against the clove. The clove is then removed, and the skin should be wrinkled and torn in places. The user then inserts the tooth end of the pick into accessible wrinkles and tears in the skin, using the pick to further pry away and remove the skin.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

I claim:

1. A peeler, comprising:
   a tubular main body having a first open end, an opposing second open end, and a hollow interior extending from the first open end to the second open end, a top extending from the first open end to the second open end, and a bottom diametrically opposite the top and extending from the first open end to the second open end, the top having a length which is shorter than a length of the bottom;
   the tubular main body being formed from a first flexible material allowing the tubular main body to deform under pressure by a user; and
   a pick attached to the first open end and extending away from the second open end, the pick being formed from a second material, the second material being different from the first material and further being relatively more rigid than the first material;
   the pick further defining a tooth end and a mount end, the mount end being attached to the tubular main body and the tooth end extending away from the tubular main body;
   wherein the tubular main body defines a circumference and the pick is attached to the tubular main body along a portion of the circumference, the portion of the circumference being less than 180 degrees.

2. The peeler of claim 1, wherein the first open end further comprises a first top rim and the second open end further comprise a second top rim, the pick having a pick axial length from the tooth end to the mount end, wherein less than one third of the pick axial length extends into the interior of the tubular main body between the first top rim and the second top rim.

3. The peeler of claim 2, wherein less than one quarter of the pick axial length extends into the interior of the tubular main body between the first top rim and see above the second top rim.

4. The peeler of claim 1, wherein the portion of the circumference is less than 140 degrees.

5. The peeler of claim 1, wherein the portion of the circumference is less than 120 degrees.

6. The peeler of claim 1, wherein the portion of the circumference is less than 100 degrees.

7. The peeler of claim 1, wherein the pick is rounded along a portion of the circumference.

8. The peeler of claim 1, wherein the tooth end terminates in a point.

9. The peeler of claim 1, wherein the tubular main body is formed from an elastomeric material and the pick is formed from a rigid plastic material.

* * * * *